C. M. VAIL.
Churn.
No. 19,389.
Patented Feb. 16, 1858.
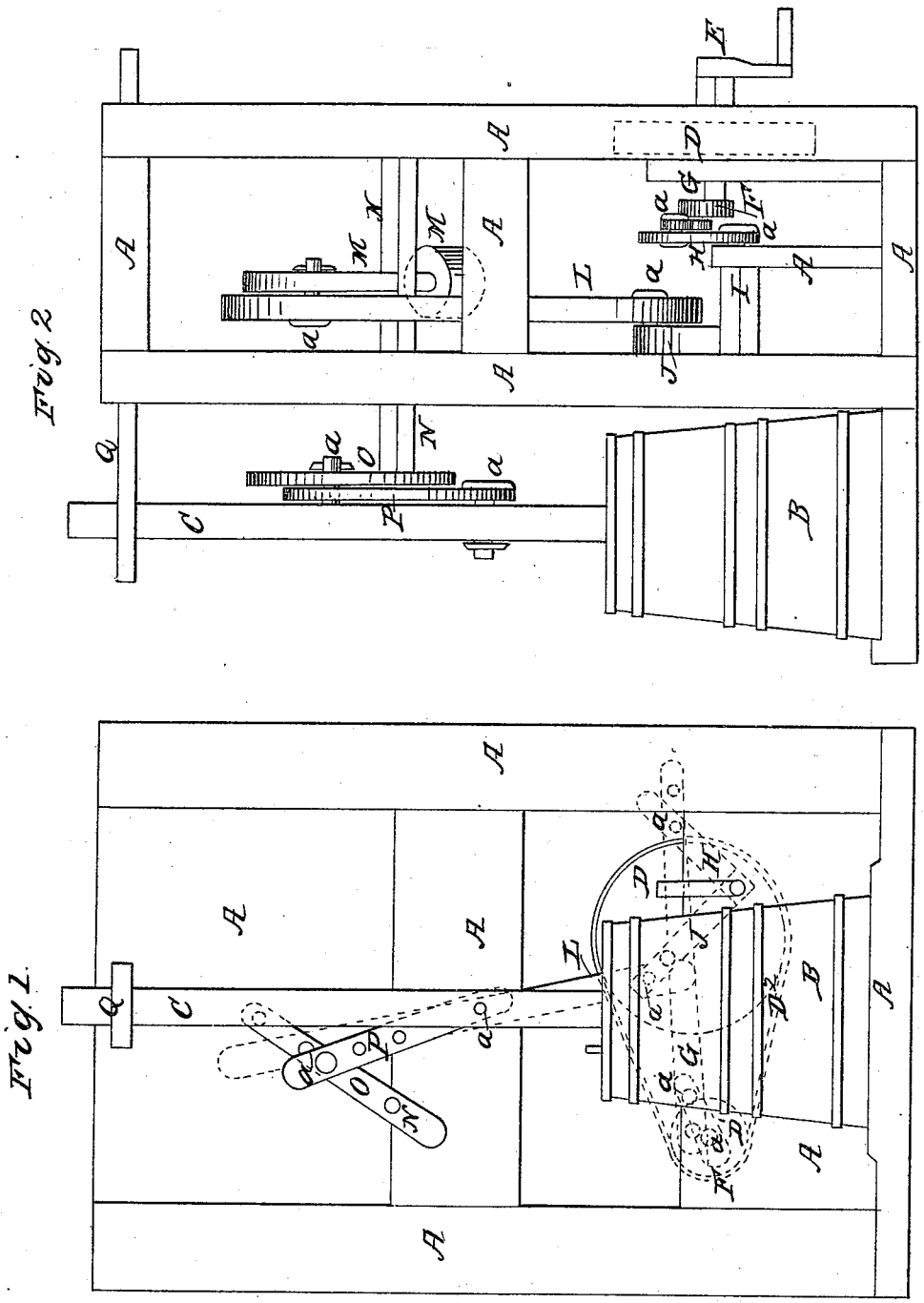

UNITED STATES PATENT OFFICE.

CHARLES M. VAIL, OF SUSQUEHANNA DEPOT, PENNSYLVANIA.

CHURN.

Specification of Letters Patent No. 19,389, dated February 16, 1858.

*To all whom it may concern:*

Be it known that I, CHARLES M. VAIL, of the borough of Susquehanna Depot, county of Susquehanna, and State of Pennsylvania, have invented a new and useful Mode of Propelling the Dasher Barrel-Churn; and I do hereby declare that the following is a full, clear, and exact description of the construction and operation of the same, reference being had to the annexed drawing, making a part of this specification.

To enable others skilled in the art to make and use my invention I will proceed to describe its construction and operation.

Figure 1 represents a side view of the construction entire, Fig. 2 represents an end view of the construction entire.

The same letters designate like parts in each figure.

In the construction of my apparatus for propelling the dasher of the barrel churn, A, represents frame work for support of machinery, B, churn, C, dasher, D, balance wheel and belt wheel combined, $D^1$ connecting pulley, $D^2$ strap or belt, E, crank for hand power and pulley for whatever power is requisite to be applied, F, attaching crank from pulley, $D^2$ to horizontal connecting rod G, H, graduated lever, I, connecting shaft of graduated lever H and graduated lever J, L, perpendicular connecting rod of graduated lever H and J, M attaching arm and support of governor or regulator, $M^1$ passing through connecting shaft N, $N^1$ continuation of shaft N passing through framework (A) and attaching by its terminal extremity to graduated lever O, P graduated lever attached to dasher C in immediate contact with churn lid, and graduated lever O making in all a complete attachment throughout.

(*a*) represents attaching pins, Q director passing through upper part of framework and perforated at its terminal end through which passes dasher C.

My machine may be operated either by crank or pulley operated upon as it is by a compound balance and pulley wheel and being connected by means of a strap or belt to a pulley which is connected to a crank and that by a rod to a lever graduated for the purpose of increasing or diminishing the length of the stroke, and that lever by a shaft to a second graduated lever, and that lever by a second rod graduated to meet the size of the machine to a graduated supporting arm which passing through a shaft gives place to the governor or stroke regulator that producing a perfect equilibrium and sustaining the same. The shaft through which the supporting arm passes extends through the framework (by which it is supported) and affords on its terminal extremity an attachment for a third graduated lever. The third graduated lever at its free extremity is attached to a fourth graduated lever and that to the dasher in immediate contact with the churn lid. The whole being constructed from wood not a particle of metal entering into the same.

Each part of my machine is so constructed that it may be applied to any sized churn, also that the dog, horse, sheep, calf or water machines now in use may be attached as the propelling powers. The 1st and 2nd levers from the point where the power is applied are intended to greatly increase the power from its first application, the "governor" to control said power where obtained while levers described 3rd and 4th are so arranged, by graduation, as to bring the dasher each elevation above the cream or milk in the churn for the purpose of forcing the air through the milk, a very essential part in the production of good butter and by the attachment of lever 4 to the dasher at the point represented the power is greatly increased, and the resistance greatly diminished, proving conclusively that my arrangement of pulleys, cranks and levers will overcome a greater resisting force, with less power applied than any other arrangement known.

What I claim as my invention and desire to secure by Letters Patent is,

The use of the graduated levers in connection with the governor $M^1$, the whole constructed as herein described, and operating on the dasher staff through the director Q keeping it in a vertical position and avoiding friction as herein set forth.

CHARLES M. VAIL.

Witnesses:
W. H. C. VAIL,
LUCENE BUCK.